2,811,460

CELLULOSE ORGANIC ACID ESTER PLASTICS CONTAINING META - METHOXYPHENYL p-HYDROXYBENZOATE

Lester W. A. Meyer and Margaret H. Broyles, Kingsport, Tenn., assignors to Eastman Kodak Company, Rochester, N. Y., a corporation of New Jersey No Drawing. Application November 24, 1953, Serial No. 394,202

3 Claims. (Cl. 106—179)

This invention relates to cellulose organic acid ester plastics, and more particularly to the stabilization of such plastics.

As is well known in the art, plastics having excellent properties for a great many purposes can be prepared from cellulose organic acid esters, such, for example, as cellulose acetate, cellulose propionate, cellulose butyrate, cellulose, acetate-propionate and cellulose acetate-butyrate, with suitable plasticizers. Many examples of suitable plasticizers are shown in the art. The choice of plasticizers forms no part of our invention.

However, cellulose organic acid ester plastics have not been entirely suitable for use in places where they are exposed to a considerable amount of ultra-violet light: e. g., out of doors. After one or two months of outdoor exposure in a sunny climate, the plastic bleached and became increasingly brittle until, at the end of from three to six months, depending on the severity of the climate, crazing occurred. The rapid deterioration of appearance was accompanied by an equally rapid breakdown in physical properties, such as strength.

Some compounds whose addition to the plastic composition inhibited physical breakdown of the plastic, caused intense discoloration when the plastic was exposed for any length of time to sunlight or other source of ultra-violet light.

We have found that the addition of a small proportion of m-methoxyphenyl p-hydroxybenzoate

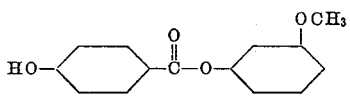

to a cellulose organic acid ester plastic composition strongly inhibits breakdown of the resulting plastic by exposure to ultra-violet light. We prefer to use approximately 0.5% to 1% of m-methoxyphenyl p-hydroxybenzoate, based on the weight of cellulose organic acid ester. Higher amounts give only slightly greater weathering resistance, and may change the physical properties of the plastic. As cellulose organic acid esters, we have employed those mentioned above, in which the acyl groups contain from 2 to 4 carbon atoms. Cellulose acetate plastics are not as effective for outdoor uses as are the mixed and higher esters, that is, those containing an acyl group higher than acetyl, because the usual cellulose acetate plasticizer retention is rather poor under outdoor exposure.

Meta-methoxyphenyl p-hydroxybenzoate was prepared as follows:

A mixture of 69 grams (0.5 mole) of p-hydroxy benzoic acid, 124 grams (1 mole) of resorcinol mono-methyl ether, and 2 drops of sulphuric acid were fused in a one liter, 3-necked flask fitted with an agitator, thermometer, and an automatic decanting reflux condenser for four hours collecting the theoretical water of reaction. The temperature of the base heater rose from 200° C., where water of reaction was collected, to 220° C., during the period of heating.

The cooled product was dissolved in methanol to be neutralized with 20 percent sodium carbonate solution. A large excess of water was added to the neutralized methanol solution of the production precipitating a slightly colored product which was collected by filtering. This solid was again dissolved in boiling methanol and treated with 5 percent NuChar. The filtered solution again was diluted with a large excess of water yielding yellow crystals of the product. A total of 54 grams of product were collected, representing a 45 percent yield. The following analysis was made of the product:

Percent acid _____ 1.92
Percent OH _____ 7.40
Theoretical percent OH _____ 6.90
Melting point (°C.) _____ 196–199
Theoretical percent carbon _____ 68.8
Calculated percent carbon _____ 68.84
Theoretical percent hydrogen _____ 4.90
Calculated percent hydrogen _____ 5.09

In testing our cellulose organic acid ester plastics containing m-methoxyphenyl p-hydroxybenzoate, we have tested sheets of 0.050 inch thickness by the Kline test, designated as A. S. T. M. D795–49. The method consists of the following test cycle:

18 hours under General Electric S–1 sunlamp (6 inches below lamp)
2 hours in fog chamber
2 hours under S–1 sunlamp
2 hours in fog chamber This cycle was repeated until the first sign of surface failure of the samples of plastic, as shown by dulling, chalking, checking, crazing, or discoloration. The temperature inside the accelerated weathering machine is maintained at 55° to 60° C.

It has been found by the National Bureau of Standards, and verified by us, that roughly 200 hours' sunlamp exposure by this test is equivalent to one year's outdoor exposure at Washington, D. C. Outdoor exposure farther south or at higher altitude is more severe, however.

The following table shows the values obtained by weathering similar samples of plasticized cellulose acetate-butyrate plastics of the same compositions, containing (a) no ultraviolet inhibitor, (b) 1% based on the cellulose ester, of the well-known ultraviolet inhibitor, phenyl salicylate, and (c) 1%, based on the cellulose ester, of m-methoxyphenyl p-hydroxybenzoate.

| Inhibitor | Hours to Failure | Color of Plastic | |
|---|---|---|---|
| | | Start of Test | End of Test |
| None | 200–250 | | |
| Phenyl salicylate | 1,000 | 5 | 6 |
| m-Methoxyphenyl p-hydroxybenzoate | 1,860 | 3 | 3 |

The numbers in the "color of plastic" column indicate the relative intensity of coloration of the samples.

At the end of 1860 hours, the sample containing the m-methoxyphenyl p-hydroxybenzoate showed slight checking of the surface.

m-Methoxyphenyl p-hydroxybenzoate is advantageously introduced into a cellulose organic acid ester plastic at the time the cellulose ester is compounded with the plasticizer. This compounding may be accomplished by any of the known methods, including the method of working on hot rolls described in Conklin's U. S. Patent 2,155,303. m-Methoxyphenyl p-hydroxybenzoate causes no substantial discoloration of the plastic, even when the hot-rolling method of compounding is employed, and no substantial discoloration takes place during accelerated testing.

By way of application, we give the following example of making up cellulose organic acid ester plastics containing m-methoxyphenyl p-hydroxybenzoate. It will be understood that this illustration does not constitute a limitation of our invention, which is defined in the appended claims.

*Example.*—100 parts of cellulose acetate butyrate containing approximately 12% acetyl and 37% butyryl is intimately mixed in a sigma-blade mixer with 13 parts of dibutyl sebacate and 1 part of m-methoxyphenyl p-hydroxybenzoate. The mixture is worked on hot rolls by the method described in the Conklin Patent 2,155,303. The resulting plastic can then be granulated and be ready for any molding or extrusion operation.

Any of the know plasticizers for cellulose organic acid esters, such, for example, as dibutyl phthalate, dibutyl sebacate, methoxyethyl stearate, tricresyl phosphate, butoxyethyl phthalate, diamyl phthalate, ethyl p-toluene sulfonamide, etc. may be used. In the case of the softer cellulose esters, such as cellulose acetate-butyrate, plastics may even be formed without the use of any plasticizer.

What we claim as our invention and desire to be secured by Letters Patent of the United States is:

1. A cellulose organic acid ester plastic comprising a cellulose organic acid ester selected from the group consisting of cellulose actate, cellulose propionate, cellulose butyrate, cellulose acetate-propionate and cellulose acetate-butyrate, a plasticizer therefor, and, as an agent for inhibiting deterioration of the plastic by ultra-violet light, approximately 0.5%–1%, based on the weight of the cellulose ester, of m-methoxyphenyl p-hydroxybenzoate.

2. A cellulose acetate-butyrate plastic comprising cellulose acetate-butyrate, a plasticizer therefor, and, an agent for inhibiting deterioration of the plastic by ultra-violet light, approximately 0.5%–1%, based on the weight of the cellulose acetate-butyrate, of m-methoxyphenyl p-hydroxybenzoate.

3. A cellulose acetate-butyrate plastic comprising cellulose acetate-butyrate and, as an agent for inhibiting deterioration of the plastic by ultra-violet light, approximately 0.5%–1%, based on the weight of the cellulose acetate-butyrate, of m-methoxyphenyl p-hydroxybenzoate.

References Cited in the file of this patent

UNITED STATES PATENTS

| | | |
|---|---|---|
| 1,930,135 | Smith et al. | Oct. 10, 1933 |
| 2,198,582 | Grether et al. | Apr. 23, 1940 |
| 2,432,517 | Dreyfus | Dec. 16, 1947 |

OTHER REFERENCES

Meyer et al.: "Jour. Ind. Eng. Chem.," 43, 1585–91 (1951).